Nov. 15, 1949     L. A. WILLIAMS, JR     2,488,250
FUEL FEED CONTROL APPARATUS
Filed Sept. 4, 1944     2 Sheets-Sheet 1
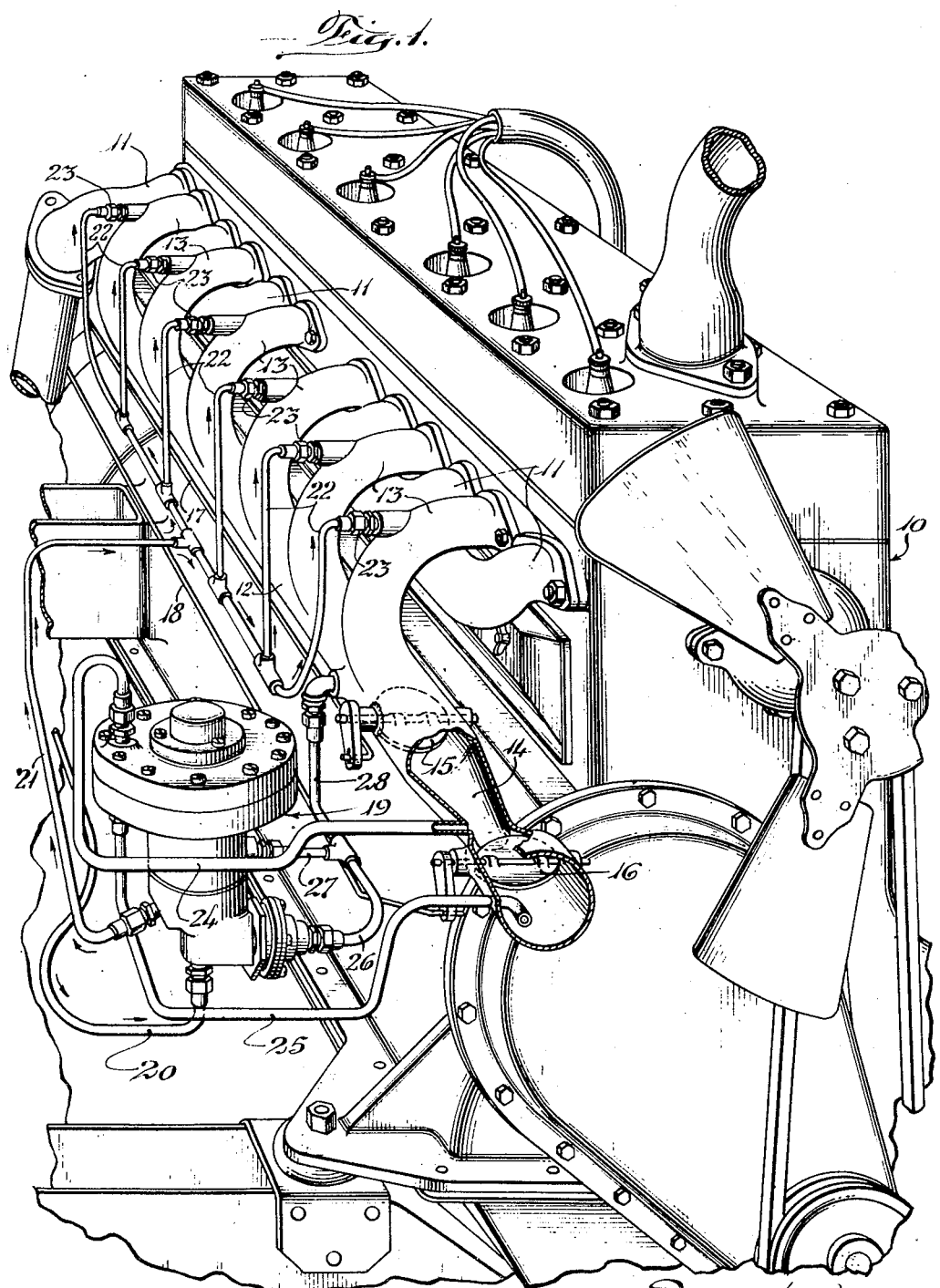

Nov. 15, 1949 L. A. WILLIAMS, JR 2,488,250
FUEL FEED CONTROL APPARATUS
Filed Sept. 4, 1944 2 Sheets-Sheet 2
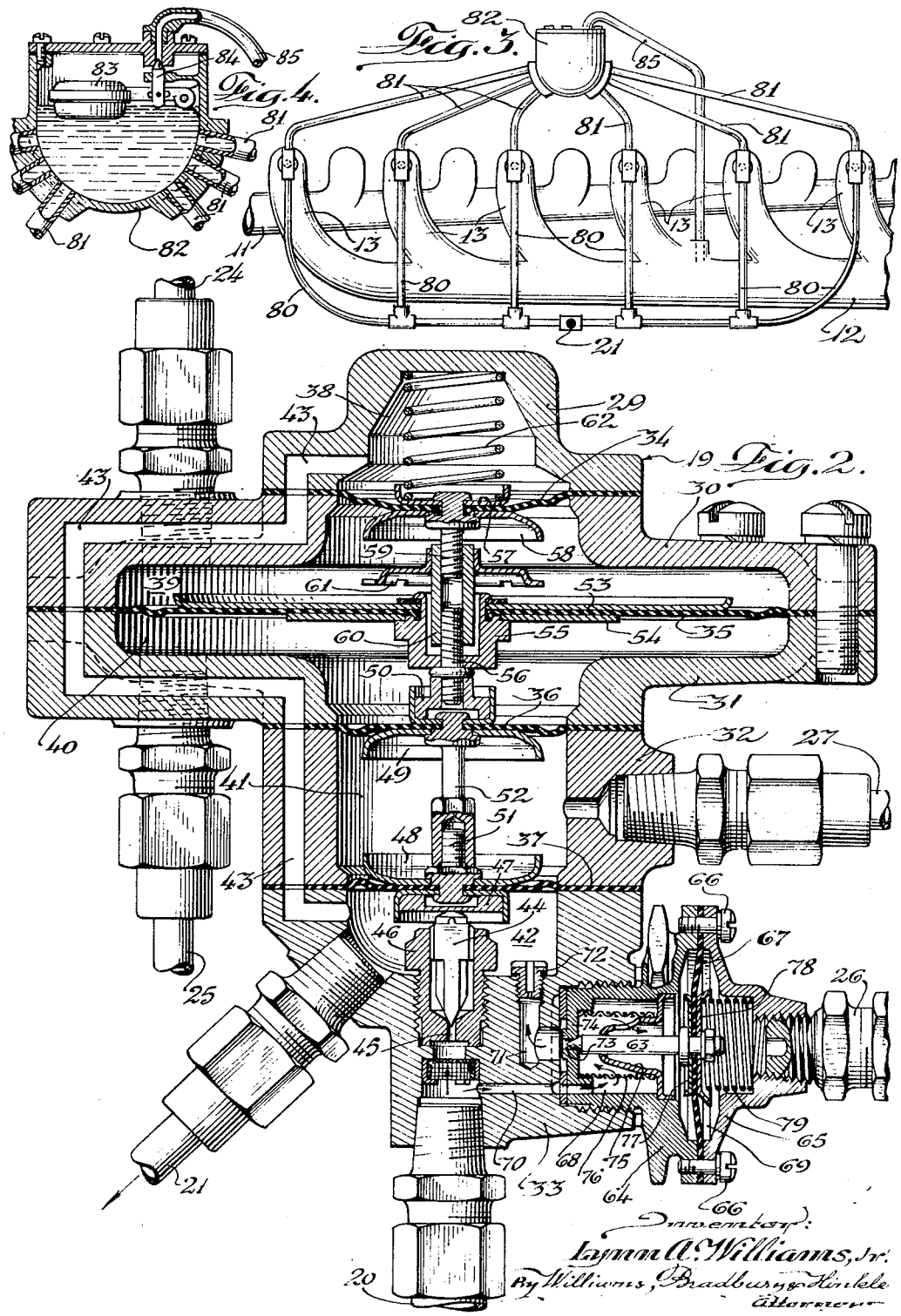
Inventor:
Lynn A. Williams, Jr.
By Williams, Bradbury & Henkele
Attorneys

Patented Nov. 15, 1949

2,488,250

UNITED STATES PATENT OFFICE 2,488,250

FUEL FEED CONTROL APPARATUS

Lynn A. Williams, Jr., Northfield, Ill., assignor to Stewart-Warner Corporation, Chicago, Ill., a corporation of Virginia Application September 4, 1944, Serial No. 552,651

3 Claims. (Cl. 261—69)

My invention relates to fuel feed control apparatus particularly adapted to feed a mixture of air and vaporized fuel to an internal combustion engine. It is the object of the invention to provide an improved apparatus arranged so that the means for feeding air and fuel to the cylinders of an engine may be regulated and coordinated in such manner as to provide the desired richness of the air and fuel mixture for the varying phases of starting, idling, and operation under load conditions.

It is one of the objects of the invention to provide an improved arrangement whereby a substantially constant differential between the pressure of the fuel and the pressure of the stream of air at the point where the fuel is sprayed into the air may be quickly established after a change in running conditions so that the amount of air admitted past the throttle shall effectively control the amount of fuel supplied to the engine. The invention is an improvement upon the arrangement shown and described in the patent to John H. Leslie, II, No. 2,446,051, dated July 27, 1948, and contains subject matter in common with application Serial No. 563,261, filed November 13, 1944, for Carbureting apparatus, by John H. Leslie, II, now abandoned.

By my improved arrangement, gasoline or other fuel is delivered under constant pressure to a port controlled by a needle valve, the position of the valve being regulated by varying pressures applied on a plurality of interrelated diaphragms. The parts and the connections by which pressures are applied on the several diaphragms are arranged so that the needle valve is pressed toward its closed position by a spring, by a differential pressure of the fuel, and by a differential pressure of the air in the intake manifold of the engine. The arrangement is such that these pressures are opposed by a differential suction effect in the intake manifold, or alternatively by a differential suction effect through a pipe opening at the throat of a Venturi tube through which air is admitted to the intake manifold. The parts are so proportioned and balanced that a substantially constant ratio between the pressure of the fuel and the pressure of the air at the point where the fuel is sprayed into the air is quickly established from time to time as the volume of the air entering is varied by the use of the throttle. Under these circumstances, the control of the engine is effective and the operation efficient.

It is another object of my invention to provide an improved arrangement of fuel control means comprising a needle valve which shall open wide for the admission of fuel for starting the engine and which shall control the feed of fuel under load conditions, and an auxiliary valve which shall control the admission of fuel during the idling of the engine.

It is an object of the invention to provide an improved arrangement for feeding air and fuel to an internal combustion engine, in which each of the intake ports of the engine shall be connected to a separate air duct, with the several ducts manifolded together and leading to a Venturi tube located ahead of the throttle valve and to the rear of a choke valve, and in which the gasoline or other fuel is sprayed under pressure through separate spray nozzles into the several air ducts at points adjacent to the inlet valves of the cylinders.

It is another object of my invention to provide an improved arrangement for removing from the fuel feeding means any fuel vapor which may develop at any point ahead of that at which the fuel is normally vaporized and fed to the air entering the cylinders.

It is another object of the invention to improve apparatus of this type in sundry details hereinafter pointed out. A preferred means by which the several objects are accomplished is illustrated in the accompanying drawings, in which:

Fig. 1 is a perspective view of a portion of an internal combustion engine equipped with a preferred form of my invention;

Fig. 2 is a central vertical sectional view through a valve structure for feeding measured amounts of fuel to the spraying devices of an internal combustion engine;

Fig. 3 is a diagrammatic view of a portion of an engine provided with a modified form of fuel feeding means comprising an arrangement for removing vapor from the feed lines; and Fig. 4 is a vertical sectional view through a float bowl forming a part of the arrangement as shown in Fig. 3.

Referring now to Figs. 1 and 2 of the drawings for a description of the form of device as there shown, 10 indicates an internal combustion engine having an exhaust manifold 11 of any approved type, and an intake manifold 12 provided with ducts 13 leading to the several cylinders of the engine. At its forward end, the manifold 12 assumes the form of a Venturi tube, indicated by the numeral 14, a throttle valve 15 being movably mounted in position to close the passageway a short distance to the rear of the throat portion of the Venturi tube, and a choke valve 16 being movably mounted in position a short distance ahead of the throat portion. Links 17 and 18 are connected with the valves 15 and 16, respectively, for controlling their position in a well known manner.

In the arrangement shown (see Fig. 2), the fuel regulating valve 19 is formed of five casing sections 29, 30, 31, 32 and 33, connected together by any suitable means, with flexible diaphragms 34, 35, 36 and 37 interposed between the several casing parts to provide a plurality of chambers. By the use of the flexible diaphragms between the several chambers, each of the chambers is given one or more yielding wall portions adapted to be moved inwardly or outwardly in accordance with pressure conditions in the chambers. In the arrangement shown, I have provided a fuel pressure chamber 42 at the bottom of the device, connected by a duct 43 with a second fuel pressure chamber 38 at the top, such duct 43 being formed by connected bores in the casing sections.

Immediately below the fuel pressure chamber 38, there is a Venturi air suction chamber 39, and immediately below that an atmospheric pressure chamber 40. Between the atmospheric pressure chamber 40 and the bottom fuel pressure chamber 42, I have provided an intake manifold pressure chamber 41. The several chambers are operatively connected with the engine 10, in the arrangement shown, by a series of pipes, fittings, and other parts as hereinafter specified for establishing the required communication between the engine and the several chambers whereby the pressure conditions in the engine at different points and under varying circumstances may control the feed of the fuel to the engine.

In the construction illustrated, gasoline or other liquid fuel is supplied to the fuel pressure chamber 42 under constant pressure through a pipe 20 from any suitable source. Measured amounts of the fuel are carried from the fuel regulating valve 19 by a pipe 21 and branch pipes 22 to spray nozzles 23 of any approved type, mounted in the walls of the air ducts 13 in close proximity to the intake valves of the engine cylinders. Communication is established between the Venturi air suction chamber 39 and the throat portion of the Venturi tube 14 by means of a line of piping 24.

A pipe 25, communicating with the atmospheric pressure chamber 40, opens to the atmosphere at any desired point, being shown in the drawings as opening to the atmosphere at a point immediately ahead of the choke valve 16. In many embodiments of the invention, it would be immaterial at what point the opening to the atmosphere was provided, but in some instances where an air filter or a turbo supercharger might be employed, it might be highly desirable to have the parts arranged as shown in the drawings so that the pressure in the chamber reflects any differences from true atmospheric pressure caused by the presence of such a filter or supercharger.

In the arrangement shown in the drawings, communication is established by pipes 27 and 28 between the intake pressure chamber 41 and the intake manifold 12 at a point a short distance to the rear of the throttle valve 12, and by pipes 26 and 28 between the casing member 65, as hereinafter described, and the intake manifold at said point to the rear of the throttle valve. It will be understood that the form of the connections may be varied as desired without departing from the invention so long as the desired lines of communication are established.

For controlling the passage of liquid fuel from the pipe 20 or other source into the fuel pressure chamber 42 for movement to the spray nozzles 23, a needle valve 44 is provided, tapering to a sharp point at its lower end and movably mounted in position to close an opening 45 through a plug 46 mounted in the bottom wall of the casing part 33. At its upper end, the needle valve 44 engages a pressure plate 47 carried by the diaphragm 37, the diaphragm being gripped between the plate 47 below and a plate 48 above. The diaphragm 36 is likewise gripped between two plates 49 and 50. In the arrangement shown, the diaphragms 36 and 37 are connected together by means of pins 51 and 52 which have riveted connection with said plates 47, 48, 49 and 50 and have screw threaded connection with each other.

The diaphragm 35 is provided with reinforcing plates 53 and 54 which are held in gripping relationship to the diaphragm by a cup-shaped rivet 55 which is connected to the plate 50 by a screw threaded pin 56. The diaphragm 34 also is provided with reinforcing plates 57 and 58 which are held in gripping relationship to the diaphragm by a pin 59 having a riveted connection with said plates, the pin 59 being in axial alignment with the pin 56 and being adjustably connected with said pin by means of a turnbuckle arrangement comprising a sleeve 60 provided with a notched plate 61 rigidly mounted thereon.

Access to the plate 61 may be provided in any suitable manner for turning the plate, as by a normally plugged opening through the wall of the casing part 30, so as to enable an operator to adjust the diaphragm 34 toward and from the diaphragm 35, as may be desired. Above the plate 57, I have mounted a coiled spring 62 bearing at its upper end on the top wall of the casing member 29, such spring being adapted to apply downward pressure on the needle valve 44 through the train of parts as above described. An upward adjustment of the pin 59 by means of the turnbuckle arrangement serves, of course, to compress the spring 62 so as to cause it normally to have increased resilient pressure downwardly on the needle valve 44.

With the chambers 38 and 42 filled with gasoline or other liquid fuel supplied under pressure through the pipe 20, such fuel presses upwardly on the diaphragm 37 and acts through the duct 43 to press downwardly on the diaphragm 34, serving to apply a differential pressure downwardly on the needle valve 44 by reason of the fact that the diaphragm 34 is of greater effective size than that of the diaphragm 37. Such differential downward pressure of the fuel and the downward pressure of the spring 62 serve normally to hold the needle valve 44 seated so as to prevent the movement of fuel past the valve.

When the choke valve 16 is moved into more or less completely closed position in the air inlet means and the engine is cranked so as to exert a suction effect on the inlet manifold 12, such suction effect applied through the pipe 27 pulls downwardly on the diaphragm 36 and upwardly on the diaphragm 37 within the chamber 41. This serves to apply a differential pressure downwardly upon the needle valve 44, by reason of the fact that the diaphragm 36 is of larger effective size than that of the diaphragm 37. At the same time under these conditions, with the choke valve closed and with the crank shaft being rotated for starting the engine, the low pressure condition in the intake manifold exerts a strong suction effect through the pipe 24 upon the diaphragms 34 and 35 of the valve chamber 39, serving to apply a strong pull upwardly on all of the diaphragms by reason of the fact that the diaphragm 35 is of very much larger effective size than that of the diaphragm 34.

This upward pull on the diaphragms leaves the needle valve 44 free to move upwardly so as to permit the passage of a substantial stream of fuel past the valve and so as to produce a rich mixture in the ducts 13 leading to the cylinders, the upward pull on the diaphragm 35 being substantially in excess of the aggregate force of the downward pressure of the spring 62, the differential pressure of the fuel downwardly, and the differential suction effect downwardly on the diaphragms 36 and 37 in the chamber 41. This results in easy starting of the engine, but the condition continues only so long as the choke valve is kept closed. As soon as the choke valve is opened and the engine operates at normal idling speed, the suction effect on the pipe 24 drops, since the Venturi tube suction effect on the pipe 24 is very small so long as the volume of air passing through the tube is kept low. The needle valve 44 thereupon closes and an auxiliary fuel feeding valve 63 serves, as hereinafter described, to keep the engine running during any idling period.

With the engine idling after starting, the choke valve 16 being open and the throttle valve 15 being substantially closed, the needle valve 44 remains in its fully closed position. When, thereafter, the throttle valve 15 is opened and a large amount of air is consequently drawn in through the Venturi tube, the suction effect through the pipe 24 is quickly built up, causing the diaphragm 37 and bearing plate 47 to move upwardly so as to permit the needle valve 44 to open for the passage of the required amount of fuel. When the throttle valve 15 is opened as above specified, the suction effect through the pipes 28, 27 and 26 is substantially reduced, having the effect of closing the auxiliary fuel feeding valve 63 as hereinafter described, leaving the needle valve 44 in complete control of the delivery of fuel to the cylinders.

When the engine is running normally under load conditions, the throttle valve is partially or fully open and the choke valve is completely open. The large volume of air flowing through the throat of the Venturi tube 14 creates a high degree of suction in chamber 39 tending to open needle valve 44. If throttle valve 15 is now closed so as to practically shut off the delivery of air to the manifold 12 and ducts 13, the suction effect on the chamber 39 through the pipe 24 is immediately cut off or greatly reduced, since the Venturi tube with little air flowing through it has little effectiveness for maintaining a suction effect on the pipe 24. At the same time, a heavy suction effect is applied on the chamber 41 through the pipes 28 and 27.

A differential downward pull is thus established on the diaphragms 36 and 37 sufficient under the then existing conditions to force the needle valve 44 downwardly to its closed position. The heavy suction effect on the pipe 28 is also applied on the pipe 26 so as to open the auxiliary valve 63 for idling operation of the engine. Under these circumstances, the ratio between the fuel pressure and the air pressure at the spray nozzles 23 is kept as nearly constant as possible consistent with the continued maintenance of low pressure conditions in the air ducts as produced by the pumping action of the engine before it has slowed down to normal idling operation. The reestablishment of normal idling conditions sets up again a normal balance of pressure conditions.

The auxiliary valve means which comes into action for idling operation of the engine, comprises the auxiliary casing member 65 above referred to and a second auxiliary casing member 64, such casing members being secured together by screws 66, with a flexible diaphragm 67 secured between the casing members and dividing the enclosed space into chambers 68 and 69. The chamber 68 is connected with the fuel pipe 20 by means of a bore 70. The chamber 68 is also connected to chamber 42 by way of bore 71, restricted plug 72 and port 73 in the end wall 74 of the auxiliary casing member 64.

A dome-shaped partition 75 having an opening therethrough at one side is provided across the chamber 68, serving to support a screen 76 in said chamber 68 between the bore 70 and the valve opening 73. The auxiliary valve 63 is connected with the central portion of the diaphragm 67 in position to close the valve port 73, plates 77 and 78 being secured on opposite faces of the diaphragm for reinforcing it, a coiled spring 79 being provided between the plate 78 and a suitable portion of the auxiliary casing member 65 adapted normally to hold the auxiliary valve 63 seated so as to close the valve opening 73.

The arrangement is such that when the engine shaft is turned over for starting the engine, with the choke valve 16 closed and the throttle valve 15 opened, a strong suction effect is exerted on the chamber 69 through the pipes 28 and 26, serving to open the auxiliary valve 63 against the action of the spring 79, permitting fuel to flow through the bore 70, the valve port 73, the bore 71 and the plug 72 into the chamber 42 so as to pass into the pipe 21 with any fuel entering the chamber 42 at the same time through the valve opening 45. After the engine has started and the choke valve has been opened and the throttle valve substantially closed for causing the engine to idle, the needle valve 44 promptly closes as above described and the auxiliary valve serves by itself to provide the necessary fuel for idling purposes, the auxiliary valve 63 being held open against the action of the spring 79 by the continued suction effect transmitted through the pipes 28 and 26, the suction effect through said pipes 28 and 26 being maintained under these conditions by reason of the fact that the throttle valve is practically closed. As soon as the throttle is opened wider for power operation of the engine, the suction effect through the pipes 28 and 26 falls and the spring 79 moves the auxiliary valve 63 to its closed position. Under normal circumstances, the auxiliary valve 63 does not open to permit fuel to pass except when one of the valves 15 or 16 is closed so as to prevent substantial flow of air to the cylinders.

With the turnbuckle arrangement 60 adjusted to give the spring 62 the desired effective strength, the mechanism comprising the several diaphragm chambers for controlling the opening of the needle valve 44 is adapted to shift from time to time to maintain a balance between the forces tending to move the needle valve downwardly and the forces applied upwardly for permitting the needle valve to open, serving to cause the mechanism to open smoothly and evenly with the valve 44 opened to different degrees. In this maintenance of a balance of forces for continued operation at a fixed level, the pipe 27 serves normally to apply a differential suction effect downwardly, as above explained. The arrangement is such, however, that when the throttle 15 is closed after a period of operation under load conditions, the differential suction effect downwardly on the diaphragms through the pipe 27 becomes temporarily the dominant factor in the control of the system for causing the valve 44 to be closed quickly, this being due to the fact that under the conditions specified, the suction effect through the pipe 24 is suddenly reduced by reason of the reduced flow of air through the Venturi tube, and the suction effect through the pipe 27 is suddenly increased by reason of the fact that under such circumstances the throttle valve acts as a choke with respect to the pipe 28.

In the arrangement shown, comprising the spray nozzles 23 for delivering fuel to the air ducts 13 immediately adjacent to the cylinders, it is important that the fuel be maintained in liquid form at the highest parts of the fuel delivery pipes 22. In order to protect against the effects of vaporization of the fuel in the low pressure feed pipes 22, I have provided a modified arrangement as shown in Figs. 3 and 4 for removing from the pipes any fuel vapor formed therein. This arrangement comprises fuel feeding pipes 80 leading to the several air ducts 13 and connected with the pipe 21, each of said pipes 80 being provided with a spraying nozzle as described above in connection with the pipes 22. Each of the pipes 80 is also connected by a pipe 81 with an airtight float bowl 82 to which the fuel is adapted to rise, as illustrated in Fig. 4. As will be readily understood, any fuel vapor formed in the fuel feeding pipes rises into the bowl 82 so as to displace downwardly a portion of the liquid fuel in the bowl. When the level of the liquid in the bowl 82 is lowered to a substantial extent, a float 83 descends so as to open a valve 84 to an outlet pipe 85 leading to a suitable opening into the intake manifold 12. When the vapor has escaped through the pipe 85 so as to reduce the pressure in the bowl, the fuel, of course, rises in the bowl so as again to raise the float and close the valve 84. This upward movement of the fuel for refilling the bowl is induced by a suction effect applied from the intake manifold on the chamber 42 through the pipe 85, the bowl, and the pipes 81, 80, and 21 while the valve 84 is open.

While I prefer to employ the form and arrangement of the parts as shown in the drawings and as above described, the invention is not to be restricted thereto except so far as the claims may be so limited, it being understood that changes might well be made in the form and arrangement of the parts without departing from the spirit of the invention.

I claim:

1. An internal combustion engine carburetor comprising an air induction tube adapted to be connected to the engine at one end and being provided with a Venturi section at point remote from said engine, a fuel pressure regulator adapted to be supplied with fuel under pressure on its inlet side and to feed fuel from its outlet side to said air induction tube, said fuel pressure regulator comprising a fuel valve, means comprising a chamber enclosed by at least one diaphragm responsive to the pressure at the throat of said venturi for adjusting the pressure of fuel supply to said air induction tube substantially in proportion to the rate of air flow through said venturi, and means to prevent fluctuations in the pressure within said air induction tube from affecting the fuel flow rate into said air induction tube at constant fuel pressure including another chamber enclosed by two diaphragms of different areas connected downstream of the Venturi throat to respond to the pressure in said air induction tube and having a small differential area relative to the effective area of the diaphragm means responsive to the Venturi throat pressure for tending to decrease proportionately the pressure on the fuel supplied to said induction tube as said air induction tube pressure decreases, and throttle valve means located in said air induction tube between said venturi and the connection to said other diaphragm means.

2. An internal combustion engine carburetor comprising an air induction tube adapated to be connected to the engine at one end and being provided with a Venturi section at a point remote from said engine, a fuel pressure regulator adapted to be supplied with fuel under pressure on its inlet side and to feed fuel from its outlet side to said air induction tube, said fuel pressure regulator comprising a casing, a fuel valve, a freely floating actuating rod for said valve, diaphragms secured to said rod partitioning said casing into a series of compartments, said valve and said outlet communicating through one of said compartments, the diaphragm means defining said compartment being responsive to the fuel pressure therein, means forming an opening in a second of said compartments such that the diaphragms defining said compartment are responsive to atmospheric pressure, means providing communication between the throat of said Venturi section and a third compartment such that the diaphragms defining said compartment are responsive to the pressure in said Venturi section, means providing communication between a point in said tube downstream of said Venturi section and a fourth compartment such that the diaphragms defining said compartment are responsive to the pressure at said point, the differential area of said diaphragms being small relative to the differential area of the diaphragms responsive to the Venturi throat pressure, a throttle valve in said tube interposed between said Venturi section and said downstream point, said diaphragms being so formed that said regulator will maintain an approximately constant air fuel ratio in said induction tube.

3. An internal combustion engine carburetor comprising an air induction tube adapted to be connected to the engine at one end and being provided with a Venturi section at a point remote from said engine, a fuel pressure regulator adapted to be supplied with fuel under pressure on its inlet side and to feed fuel from its outlet side to said air induction tube, said fuel pressure regulator comprising a casing, a fuel valve, a freely floating actuating rod for said valve, diaphragms secured to said rod partitioning said casing into a series of compartments, said valve and said outlet communicating through one of said compartments, the diaphragm means defining said compartment being responsive to the fuel pressure therein, means providing communication between a point upstream of said Venturi section and one of said compartments such that the diaphragms defining said compartment are responsive to the pressure in said tube at said point, means providing communication between the throat of said Venturi section and a third compartment such that the diaphragms defining said compartment are responsive to the pressure in said Venturi section, means providing communication between a point in said tube downstream of said Venturi section and a fourth compartment such that the diaphragms defining said compartment are responsive to the pressure at said point, the differential area of said diaphragms being small relative to the differential area of the diaphragms responsive to the Venturi throat pressure, a throttle valve in said tube interposed between said Venturi section and said downstream point, said diaphragms being so formed that said regulator will maintain an approximately constant air fuel ratio in said induction tube.

LYNN A. WILLIAMS, Jr.

REFERENCES CITED

The following references are of record in the file of this patent:

UNITED STATES PATENTS

| Number | Name | Date |
| --- | --- | --- |
| 1,662,040 | Lee | Mar. 6, 1928 |
| 1,802,848 | Summers | Apr. 28, 1931 |
| 2,136,959 | Winfield | Nov. 15, 1938 |
| 2,216,422 | Schimanek | Oct. 1, 1940 |
| 2,274,532 | Dach | Feb. 24, 1942 |
| 2,277,930 | Mock et al. | Mar. 31, 1942 |
| 2,382,625 | Garretson | Aug. 14, 1945 |
| 2,387,277 | L'Orange | Oct. 23, 1945 |
| 2,391,755 | Twyman | Dec. 25, 1945 |
| 2,392,055 | Mennesson | Jan. 1, 1946 |